(12) United States Patent
Geppert et al.

(10) Patent No.: US 7,320,486 B2
(45) Date of Patent: Jan. 22, 2008

(54) PIPE CLAMP

(75) Inventors: Helmut Geppert, Karlstein (DE); Heinz Peter Wolf, Bad Soden Salmünster (DE); Stephan Mann, Bieber (DE); Michael Sommer, Büdingen (DE)

(73) Assignee: NORMA Germany GmbH, Maintal (DE)

( * ) Notice: Subject to any disclaimer, the term of this patent is extended or adjusted under 35 U.S.C. 154(b) by 400 days.

(21) Appl. No.: 10/913,804

(22) Filed: Aug. 6, 2004

(65) Prior Publication Data
US 2005/0029813 A1 Feb. 10, 2005

(30) Foreign Application Priority Data
Aug. 8, 2003 (DE) ............... 103 36 351

(51) Int. Cl.
*F16L 23/00* (2006.01)
(52) U.S. Cl. .............. 285/420; 285/261; 285/263; 285/410
(58) Field of Classification Search ........ 285/420, 285/261, 263, 407, 367, 410
See application file for complete search history.

(56) References Cited
U.S. PATENT DOCUMENTS
2,709,094 A * 5/1955 Polanski ............... 285/407
3,544,137 A * 12/1970 Contreras et al. ........ 285/261
6,604,759 B2 * 8/2003 Binoder ................ 285/261
6,758,501 B2 * 7/2004 Amedure et al. ......... 285/373
2002/0171244 A1 11/2002 Wachter et al.

FOREIGN PATENT DOCUMENTS

| DE | 434908 | 10/1926 | |
| DE | 1101066 | 3/1961 | |
| DE | 3404739 | 7/1985 | |
| DE | 198 22 915 C1 | 9/1999 | |
| DE | 199 04 409 A1 | 8/2000 | |
| GB | 2037922 | 7/1980 | |
| GB | 2156932 | * 10/1985 | ........ 285/261 |
| JP | 97517 | 4/2003 | |

* cited by examiner

Primary Examiner—David Bochna
(74) Attorney, Agent, or Firm—Friedrich Kueffner

(57) ABSTRACT

A pipe clamp for connecting two partially insertable pipes has a clamping strap that is placed circumferentially about the spherical end sections of the pipes inserted into one another. The clamping strap has two outwardly projecting clamping jaws provided with a hole through which a clamping screw extends. The clamping strap is curved about a transverse axis that is positioned for coaxially inserted pipes in the untightened state of the clamping strap in a central plane of the clamping strap extending perpendicularly to the coaxial center axes of the pipes at a spacing from a center of the spherical end sections of the pipes. The inner radius of the clamping strap in the untightened state is smaller than the outer radius of the spherical end sections such that the sum of the spacing and of the inner radius is greater than the outer radius of the end sections.

14 Claims, 5 Drawing Sheets

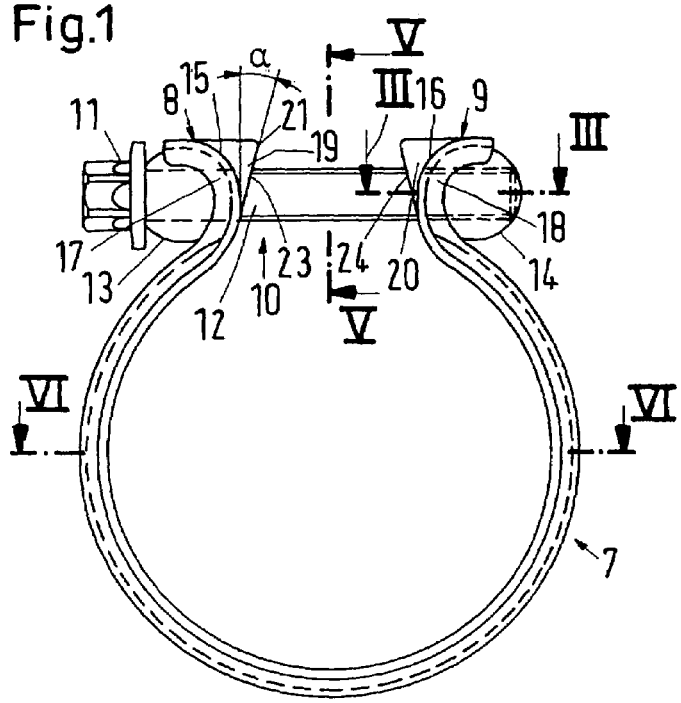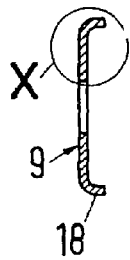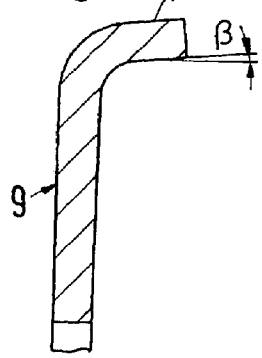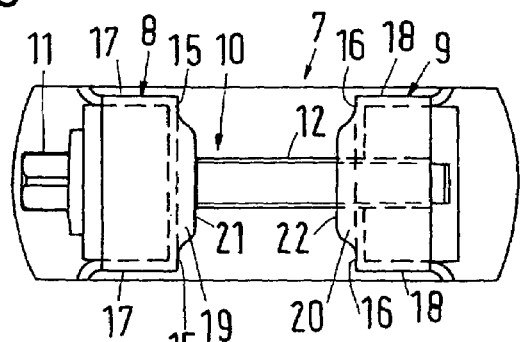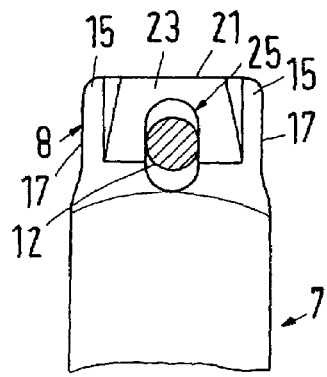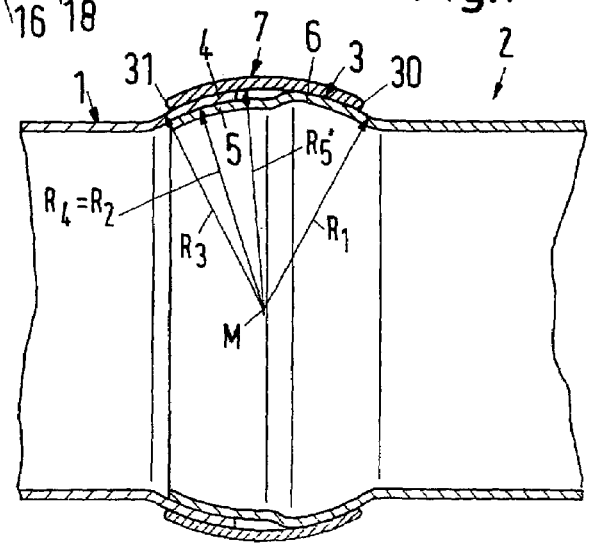

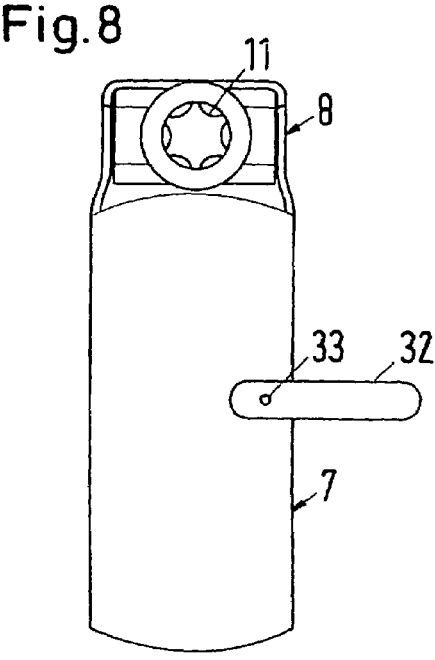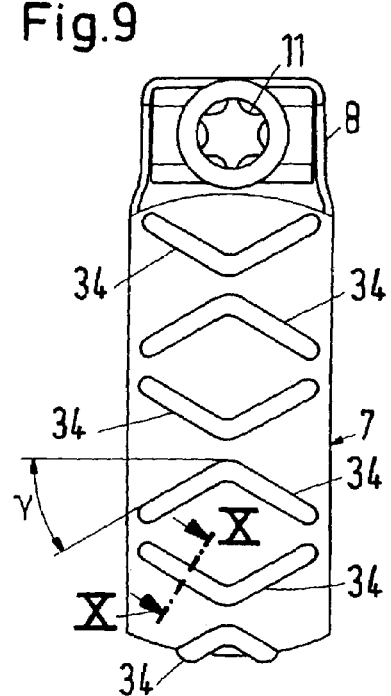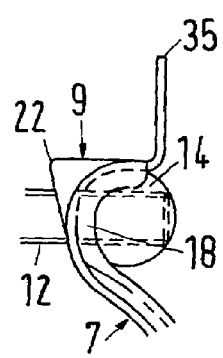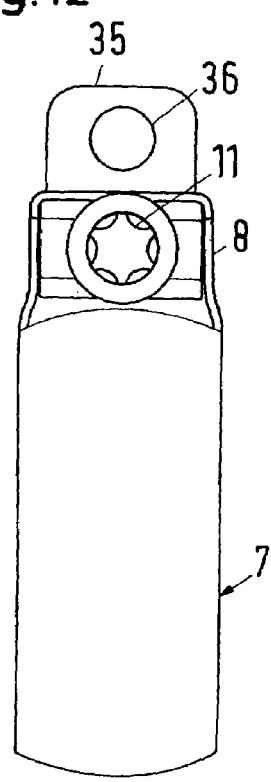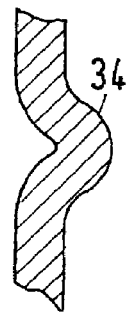

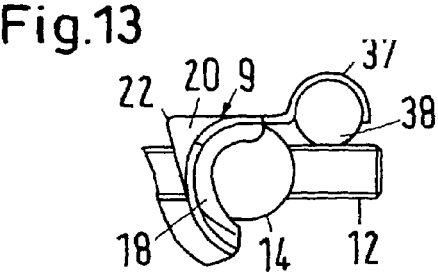
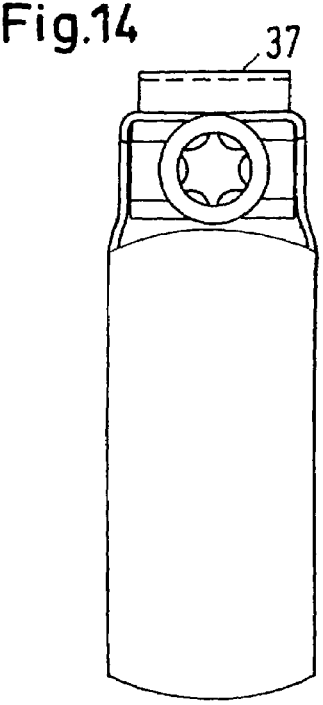
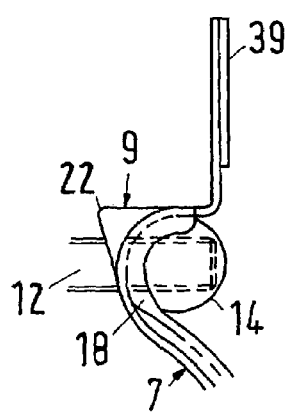
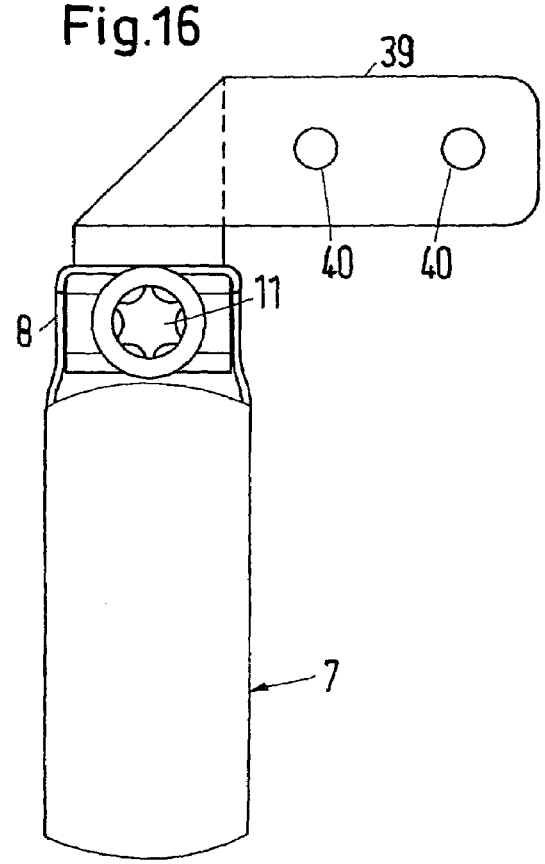

PIPE CLAMP

BACKGROUND OF THE INVENTION

1. Field of the Invention

The invention relates to a pipe clamp for connecting two pipes, in particular, pipes of a motor vehicle exhaust gas pipeline. The pipes can be inserted partially into one another and have an insertion end section and a receiving end section. The insertion end section is divided into two spherical zones of which the first spherical zone adjoining the free end of the insertion end section has an outer radius that is identical to the inner radius of the receiving end section. The receiving end section is also shaped as a spherical zone, and the insertion end section is insertable into the receiving end section. The second spherical zone of the insertion end section has an outer radius that is identical to the outer radius of the receiving end section. The pipe clamp comprises a clamp strap that can be placed about the receiving end section and the second spherical zone when the pipes are inserted into one another. The clamping strap is curved about a transverse axis that, when the pipes are coaxially inserted into one another and when the clamping strap is placed in the untightened state about the end sections of the pipes, is positioned in a center plane of the clamping strap that is perpendicular to the coaxial center axes of the pipes. The clamping strap comprises outwardly projecting clamping jaws. A clamping screw is inserted through holes in the clamping jaws. The clamping screw is supported with its head on a side of the first clamping jaw facing away from the second clamping jaw and with the other end on a side of the second clamping jaw facing away from the first clamping jaw by means of an intermediate part provided with a threaded bore engaged by the clamping screw.

2. Description of the Related Art

In known pipe clamps of the aforementioned kind, used in connection with exhaust gas pipelines of motor vehicles, the first spherical zone of the insertion end section engages the spherical zone of the receiving end section. The seal tightness of the pipe clamp is based only on a precise fit of the mutual contacting surfaces of the engaging spherical zones. The seal tightness is therefore insufficient when a high fluid pressure in the pipes is present. The clamping jaws are shaped in a similar way as the clamping jaws of the clamp according to DE 34 04 739 C1 and are connected to the clamping strap by spot welding. From the beginning, the clamping screw is curved approximately in accordance with the outer circumference of the pipes to be connected. If no curvature were provided, a contact of the clamping screw with the outer pipe surfaces could occur as a result of the support edges of the clamping jaws that, in the circumferential direction of the clamp, are positioned spaced far away from the clamp gap; this could lead to damage of the thread of the clamping screw. In an extreme situation, the clamping screw can bend when tightening the clamp; this can make tightening more difficult. Welding of the clamping jaws is not only complex but also damages a protective layer optionally provided on the clamping straps as a protection against corrosion. In addition, the welds must be subjected to a strength control.

SUMMARY OF THE INVENTION

It is an object of the present invention to provide a pipe clamp of the aforementioned kind with which the seal tightness of the pipe connection is improved for high inner pressures. Moreover, the manufacture of the pipe clamp of the aforementioned kind should be simplified and its operational safety should be increased.

In accordance with the present invention, this is achieved in that the transverse axis, about which the clamping strap in the untightened state is curved, has a spacing from the center of the spherical zones and in that the inner radius of the curvature of the untightened clamping strap about this transverse axis is smaller in comparison to the outer radius of the spherical zones such that the sum of the aforementioned spacing and of the inner radius of this curvature is greater than the outer radius of the spherical zones.

According to this solution, the pipe clamp, before being tightened finally, rests only with its inner circumferential edges on the spherical zones of the receiving end section and on the second spherical zone of the insertion end section. Upon tightening, the pipe clamp exerts axially oppositely oriented components of the tightening force onto the pipes as a result of the round outer surfaces of the spherical zones until the clamping strap, with minimal bending, rests with a large contact surface area on the spherical zones. The pipes are therefore axially compressed so that the spherical zones inserted into one another rest against one another substantially seal tightly without sealing means.

Preferably, at least the inner circumferential edges of the clamping strap are rounded. They can therefore glide easily on the outer surfaces of the spherical zones upon tightening without penetrating the outer surfaces. In this way, the pressure of the pipe clamp on the spherical zones is increased without the clamping force of the pipe clamp for tightening the clamp having to be increased. Moreover, the risk of damage of an optional protective layer on the pipes is reduced.

Moreover, the clamping jaws are preferably a monolithic part of the clamping strap. Welding of the clamping jaws onto the clamping strap is therefore not needed. In the same way, the support surfaces of the clamping jaws can be positioned closer together for the same clamp opening width as in the prior art clamps so that the probability is reduced that the clamping screw could contact the outer pipe surface and thereby damage its thread.

Also, axially positioned edge areas of the clamping jaws can be bent away from one another and form axial outwardly positioned, circular section shaped walls that are bent away from one another and between which, on the side of the clamping jaw facing the clamping screw head, and between the respective clamping jaw and the clamping screw head a hinge part is arranged so as to be rotatable, wherein the hinge part is cylindrical at least one the side that faces the clamping jaw. The hinge part has a through hole for guiding the clamping screw shaft therethrough. The intermediate part, at least its side resting against the other clamping jaw, is also cylindrical and is arranged rotatingly as a hinge part that rests against the clamping jaw. The hinge parts, similar to a hinged bolt clamp, ensure that upon clamping of the pipe clamp practically no bending moment is exerted onto the clamping screw so that the clamping screw will not bend. A prior bending of the clamping screw is also no longer needed.

The hinge parts, depending on the level of the inner pressure within the pipe that the pipe connection is to withstand can be embodied as solid hinge bolts or as hinge sleeves.

Preferably, at least that side of the sides of the hinge parts facing away from one another that is resting against the clamping screw head is planar or flat. In this way, even for a high clamping force a minimal surface pressure between the clamping screw head and the hinge part resting against it is provided.

The clamping jaws can have double-pitch roof-shaped projections having a ridge that extends in the axial direction of the pipe clamp and whose sides positioned to face the opposing clamping jaw are slanted toward one another so that they define an acute angle relative to a transverse plane of the clamping screw. When tightening the pipe clamp, the clamping jaws with their ridges abut one another shortly before the clamping strap rests with a large contact surface area against the spherical zones. By additional tightening of the pipe clamp, the clamping strap can rest subsequently with a large contact surface area on the spherical zones without the clamping jaws contacting one another with large contact surface areas. The clamping screw, in the tightened state of the pipe clamp, is therefore subjected to a pretensioning action exerted by the clamping jaws, caused by a minimal elasticity of the clamping jaws. The risk that the clamping screw will loosen because of vibrations, for example, when driving the motor vehicle whose exhaust gas pipeline is provided with the pipe clamp, is therefore minimized.

When the ridges of the projections are shorter than the clamping jaw width in the axial direction, a clamping jaw shape results which, as a result of several bending edges, is stiff in itself and therefore withstands even high clamping forces without permanent deformation.

The holes in the clamping jaws are preferably slotted holes extending outwardly away from the clamping strap. When tightening the pipe clamp, the clamping screw will therefore not be bent by a bending moment that is exerted upon tightening of the pipe clamp by the edges of the slotted holes onto the clamping screw.

The pipe clamp can have a tab by which the pipe clamp can be pre-mounted on one of the pipes at least until final mounting has been completed or the pipe clamp can be secured stationarily, in particular, on the chassis of a motor vehicle. In this way, on the one hand, it is achieved that the pipe clamp can be more easily mounted and, on the other hand, that it will not be lost when the clamping screw, for example, as a result of insufficient tightening of the clamping screw, should become loose.

The tab can be welded to the clamping strap or can be formed as a unitary part thereof. This type of connection between the clamping strap and the tab has the advantage in comparison to a detachable connection by screws that it is safer and can be manufactured more easily.

Preferably, the clamping strap is provided with reinforcements grooves. The reinforcement grooves increase not only the bending resistance and thus also the restoring capability of the clamping strap into its initial shape when loosening the pipe clamp again after it has been tightened but also improves the pretensioning action of the clamping screw in the tightened state and thus the safety in regard to detachment of the clamping screw.

Also, it can be ensured that the clamping jaw where the intermediate part is supported can have a projection that extends past the intermediate part and above the free end section of the screw shaft has a bent portion for clamping a securing part between the projection and the clamping screw shaft. In this way, the pipe clamp can be fastened on a stationary securing part for suspending the pipes in a simple way.

According to a connection arrangement according to the invention, the first spherical zone adjoining the free end of the insertion end section has at least one outer circumferentially extending annular groove with a sealing ring arranged therein that rests on the inner side of the receiving section in order to further increase the seal tightness of the connection.

BRIEF DESCRIPTION OF THE DRAWING

In the drawing:

FIG. 1 shows a side view of a pipe clamp of the invention in the untightened state;

FIG. 2 shows a plan view of the pipe clamp according to FIG. 1;

FIG. 3 shows the plane of the section view III-III of the clamping jaws according to FIG. 1;

FIG. 4 shows an enlarged view of the detail X of FIG. 3;

FIG. 5 shows a section view V-V according to FIG. 1 of a clamping jaw with inserted clamping screw of the pipe clamp according FIG. 1;

FIG. 7 shows the same view as FIG. 6 but in the tightened state of the pipe clamp;

FIG. 8 shows a second embodiment of the pipe clamp with a tab welded to the clamping strap in a view from the left relative to FIG. 1;

FIG. 9 shows another embodiment of the pipe clamp of FIG. 1 with reinforcement grooves formed within the clamping strap;

FIG. 10 shows a section X-X of the reinforcement grooves according to FIG. 9 in an enlarged view;

FIG. 11 shows a detail of another embodiment of the pipe clamp according to FIG. 1 with a tab formed as a monolithic part on one end of the clamping jaw of the clamping strap;

FIG. 12 shows a view from the left of the embodiment of FIG. 11;

FIG. 13 shows a detail of a variant of the pipe clamp according to FIG. 1 with a curved tab formed as a unitary part of the clamp strap, wherein the tab engages a securing part resting on the shaft of the tightened clamping screw;

FIG. 14 shows a view from the left of the embodiment according to FIG. 13;

FIG. 15 shows a detail of a variant of the pipe clamp according to FIG. 1 with a tab formed as a unitary part on the clamping jaw end of the clamping strap;

FIG. 16 shows the pipe clamp of FIG. 15 in a view from the left relative to FIG. 1.

DESCRIPTION OF THE PREFERRED EMBODIMENTS

Figure 6:
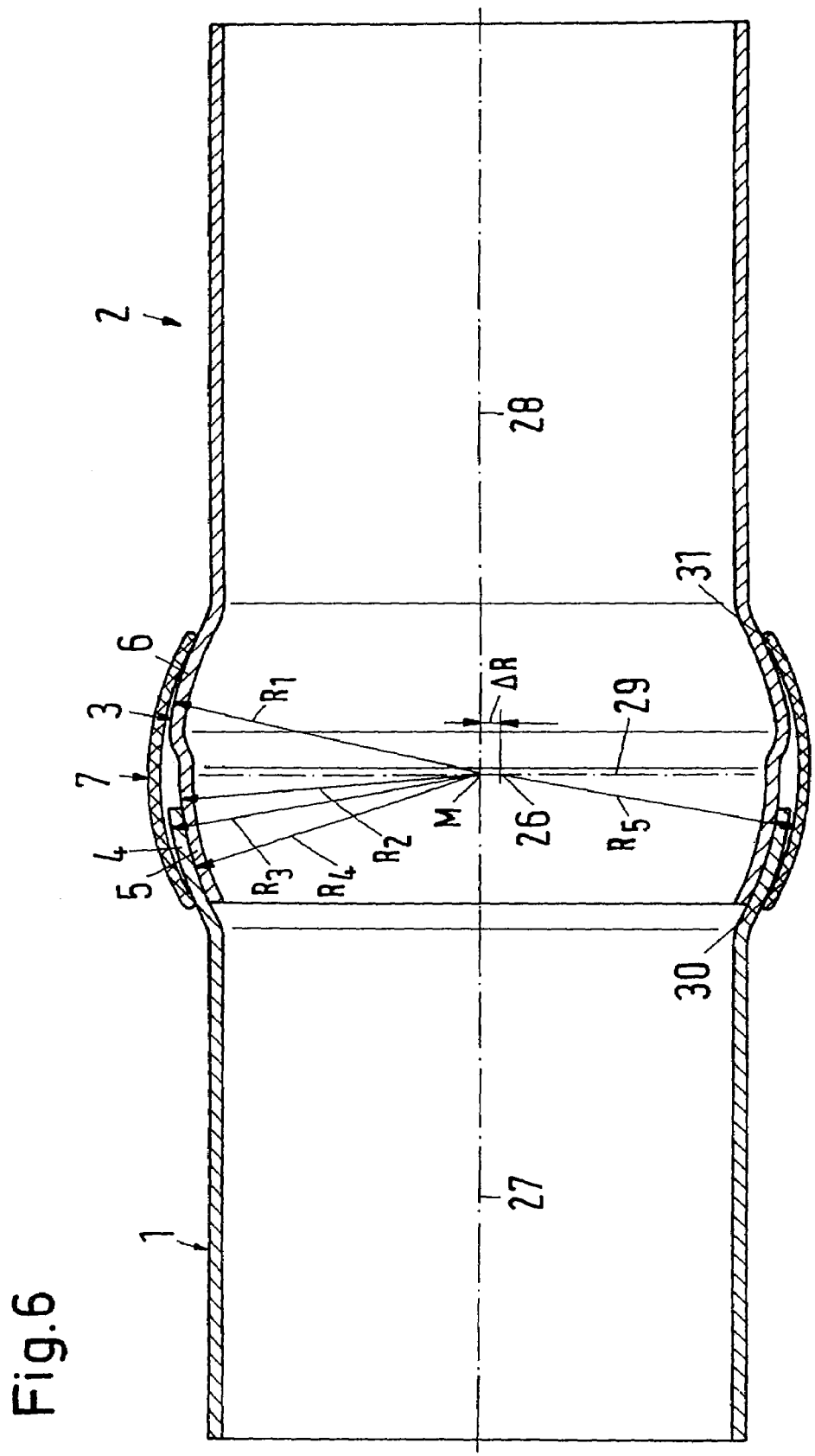
FIG. 6 shows the section view VI-VI of FIG. 1 in the mounted state of the pipe clamp positioned about coaxially inserted pipes shortly before final tightening of the pipe clamp.

The pipe clamp according to FIGS. 1 through 7 serves for connecting two pipes 1 and 2 of an exhaust gas pipeline of a motor vehicle. The pipes 1 and 2 have end sections that are partially insertable into one another: an insertion end section 3 and a receiving end section 4. The insertion end section is formed by two spherical zones 5 and 6 that have different outer radii $R_1$ and $R_2$. The receiving end section 4 is comprised of only one spherical zone having an outer radius $R_3$ that is identical to the outer radius $R_1$ of the spherical zone 6 and whose inner radius $R_4$ is identical to the outer radius $R_2$ of the spherical zone 5. The spherical zones have the purpose of positioning the pipes 1 and 2 before tightening of the pipe clamp in a position in which they are slightly angled relative to one another.

The pipe clamp according to FIGS. 1 through 7 has a clamping strap 7 that, in axial section, has an outwardly curved barrel shape whose end sections are formed to clamping jaws 8 and 9. The clamping jaws 8 and 9 are thus formed as unitary parts of the clamping strap 7. Moreover, the pipe clamp has a clamping screw 10 with a head 11 and a shaft 12 provided with a thread as well as two solid hinge parts 13 and 14.

The axially spaced edge areas 15 and 16 of the clamping jaws 8 and 9 are bent away from one another in a circular section shape and form axial outer walls 17 and 18 that are circular section shaped and bent away from one another. Between the walls 17 the hinge part 13 rests against the side of the clamping jaw 8 that is facing the clamping screw head 11; between the walls 18 the hinge part 14 rests against the side of the clamping jaw 9 facing away from the screw head 11. The side of the hinge part 13 that supports the head 11 is flat; in other respects, the hinge part 13 is formed as a solid part-cylindrical bolt that has a radially penetrating threaded hole through which the shaft 12 of the clamping screw is guided. The hinge part 14, on the other hand, is formed as a complete circular cylindrical bolt. Alternatively, the side of the hinge part 14 that is facing away from the clamping jaw 9 could also be flattened. The hinge part 14 also has a through hole that is however provided with a thread into which and through which the clamping screw 10 can be screwed. Instead of being embodied as solid bolts, the hinge parts 13, 14 can also be formed as sleeves that have the same cross-sectional contour as the bolts, wherein the hinge part 14 formed as a sleeve then has two diametrically positioned holes formed in the sleeve wall of which at least one hole has a thread for receiving the clamping screw shaft 12. As a result of their at least partially circular cylindrical shape, the hinge parts 13 and 14 are rotatable on the sides of the clamping jaws within the walls 17 and within the walls 18, respectively. The clamping screw 10 is therefore hardly loaded by bending forces when the pipe clamp is tightened.

The clamping jaws 8 and 9 have projections 19 and 20 that are shaped approximately like a double-pitch roof 19 having ridges 21 and 22 extending in the axial direction of the pipe clamp and being shorter in the axial direction than the axial width of the clamping jaws 8, 9. This provides an internally very stiff shape of the clamping jaws 8, 9. Also, the clamping jaws 8, 9 are provided with slotted holes 25 (FIG. 5) extending away from the clamping strap 7. Their length is selected such that their radial outer ends in the tightened state of the pipe clamp do not rest against the clamping screw shaft 12. Accordingly, the clamping screw shaft 12, when tightening the pipe clamp, is not loaded by bending forces by means of the slotted holes 25.

The clamping screw head 11 can be shaped as desired, be it with an external polygon drive or a polygon socket, a Torx shape, as illustrated, and/or with a clamping screw slot.

According to FIG. 6, an important feature of the pipe clamp is that the inner radius $R_5$ of the clamping strap 7 about a transverse axis 26 (wherein the axis 26, when the pipes 1, 2 are coaxially inserted into one another and the clamping strap 7 is resting in the untightened state against the end sections 3, 4 of the pipes 1, 2, is positioned in a central plane 29 of the clamping strap 7 that extends perpendicularly to the coaxial center axes 27, 28 of the pipes 1, 2 at a spacing $\Delta R$ from the center M of the spherical zones 4-6) is smaller than the outer radius $R_1$ or $R_3$ of the spherical zones 4, 6 such that the sum of the spacing $\Delta R$ and of the inner radius $R_5$ is greater than the outer radius $R_1$ or $R_3$ of the spherical zones 4, 6.

For such a configuration, the pipe clamp, before final tightening, according to FIG. 6, rests only with its inner circumferential edges 30 and 31 against the spherical zones 4 and 6. Upon tightening, the pipe clamp therefore exerts onto the pipes 1, 2 axially oppositely oriented components of the clamping force as a result of the round outer surfaces of the spherical zones 4 and 6 until the clamping strap 7, undergoing minimal bending, rests with a large contacting surface area and in a substantially tightly sealing fashion against the spherical zones 4 and 6 in the final position according to FIG. 7; in this way, the clamping strap also forms a spherical zone in which its center of curvature coincides with the center M and its inner radius $R'_5$ is similar to the outer radii $R_1$ and $R_3$ of the spherical zones 3 and 4. The pipes 1, 2 are therefore securely and seal-tightly held together. In this connection, the dimensions of the clamping strap 7 in relation to the outer nominal diameter or radii $R_1$ and $R_3$ of the spherical zones 4 and 6 are selected such that the slanted sides 23 and 24 of the clamping jaws 8, 9 still do not rests against one another and the clamping jaws 8 and 9 as a result of their elasticity—even though it is minimal—exert a pretension onto the clamping screw 10. This contributes to a positional securing action and captive arrangement of the clamping screw 10. Also, the inner circumferential edges 30 and 31 of the clamping strap 7 are rounded. Therefore, they do not penetrate into the pipe material. The clamping strap 7 therefore can adapt to the spherical zones 4 and 6, as illustrated in FIG. 7, with reduced clamping force in comparison to edges that are not rounded.

The walls 17 and 18 of the clamping jaws 8, 9, according to FIGS. 3 and 4, are outwardly oriented at a small angle $\beta$. This facilitates the insertion of the hinge parts 13 and 14 between the walls 17 and 18, respectively. In addition, the edges of the walls 17 and 18 can also be inwardly and outwardly rounded like the edges 30 and 31 of the clamping strap 7, and the edges of the ends of the hinge parts 13 and 14 can be provided with a chamfer in order to facilitate the insertion of the hinge parts 13 and 14 between the walls 17 and 18, respectively.

In the embodiment of the pipe clamp according to FIG. 8, the tab 32 is connected by spot welding 33 to the clamping strap 7. This tab 32 enables premounting of the pipe clamp on one of the pipes 1, 2, for example, also by spot welding of the tab 32 on the pipe. This facilitates final mounting of the pipe clamp.

According to FIG. 9, the clamping strap 7 can be provided with V-shaped grooves 34 in the circumferential direction wherein the groove legs are positioned at an acute angle Y to a transverse plane. The transverse cross-section of the grooves is illustrated in FIG. 10. These grooves 34 reinforce the clamping strap 7 so that, when the pipe clamp is opened it will rebound all the more safely into its original shape that it had before having been tightened. The pipe clamp can therefore be used repeatedly without undergoing a permanent deformation. The stiff shape of the clamping jaws also contribute to this effect.

In the embodiment according to FIGS. 11 and 12, one of the clamping jaws 9 at one end of the clamping strap 7 is provided with an outwardly projecting tab 35 that is a monolithic part of the clamping strap 7 and has a through hole 36 for attachment of the pipe clamp on the chassis of a motor vehicle. The pipe clamp can therefore be used also for suspending the exhaust gas pipeline.

In the embodiment of the pipe clamp according to FIG. 13 and FIG. 14, the clamping jaw 9, on which the hinge part 14 provided with an inner thread within the transversely extending through hole is supported between the walls 18, has a projection 37. The projection 37 extends past the hinge part 14 and has a bent portion above the free end section of the screw shaft 12 penetrating the hinge part 14. The bent portion engages a securing part 38; in the illustrated embodiment the part 38 is a round bolt (screw or the like) fastened on a vehicle so that it is clamped between the clamping screw shaft 12 and the projection 37. This results in a captive securing action for the clamping screw 10 before it is being tightened. At the same time, the pipes 1, 2 can be suspended from the vehicle by means of the pipe clamp without this requiring attachment of additional parts on the pipe clamp.

In the variant according to FIGS. 15 and 16 the clamping jaw 9, in the same way as in the embodiment according to FIGS. 11 and 12, is provided with a tab 39 for attachment of the pipe clamp on the chassis of the vehicle. However, this tab 39 is angled additionally by 90° in order to attach it at a different location of the chassis by means of screws penetrating the holes 40.

Figure 17:
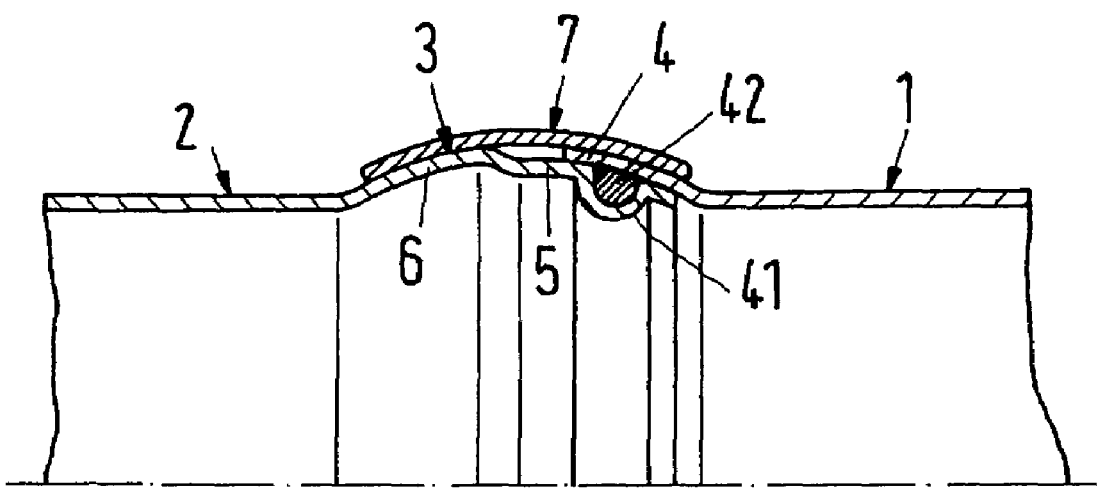
FIG. 17 shows one half of an axial section of a connecting arrangement according to the invention with a pipe clamp according to the invention additionally provided with a sealing ring between the spherical zones of the inserted pipes.

According to FIG. 17, the spherical zone 5 is provided with an outer circumferential annular groove 41 in which a sealing ring 42, in the form of an O-ring, is arranged that rests against the inner side of the receiving section 4 when the pipes 1, 2 are connected to one another by the pipe clamp. The sealing ring 42 ensures an additional sealing action of the connection relative to even higher fluid pressures in the pipes in comparison to a configuration without the sealing ring 42 and when the fluids, as in the case of, for example, soot-containing exhaust gases of a diesel engine, do not themselves ensure over the course of time an additional sealing action. In pipe connections with greater diameters and greater spherical zones 5, 6, it is possible, if necessary, to provide an additional annular groove with a sealing ring in the spherical zone 5. Especially suitable sealing ring material is, for example, rubber, Teflon®, graphite, copper or a sealing compound.

While specific embodiments of the invention have been shown and described in detail to illustrate the inventive principles, it will be understood that the invention may be embodied otherwise without departing from such principles.

What is claimed is:

1. A pipe clamp in combination with a a first pipe and a second pipe and for connecting the first pipe and the second pipe that are partially insertable into one another, wherein the first pipe has an insertion end section and the second pipe has a receiving end section, wherein the insertion end section is divided into a first spherical zone and a second spherical zone and wherein the receiving end section is shaped to form a third spherical zone, wherein the first spherical zone adjoins a free end of the insertion end section and has a first outer radius that is identical to a first inner radius of the receiving end section, wherein the first spherical zone is adapted to be inserted into the receiving end section, wherein the second spherical zone has a second outer radius that is identical to a third outer radius of the receiving end section; the pipe clamp comprising:

a clamping strap that, when the pipes are inserted into one another, is configured to be placed circumferentially about the receiving end section and the second spherical zone, wherein the clamping strap has a first outwardly projecting clamping jaw and a second outwardly projecting clamping jaw, wherein the first and second clamping jaws each have a hole;

a clamping screw having a screw head and a threaded shaft;

the clamping screw extending through the holes in the first and second clamping jaws;

wherein the head of the clamping screw is supported on a first side of the first clamping jaw which first side is facing away from the second clamping jaw;

an intermediate part positioned at a first side of the second clamping jaw, which first side is facing away from the first clamping jaw, and having a threaded bore, wherein the threaded shaft of the clamping screw (10) engages the threaded bore;

wherein the clamping strap is curved about a transverse axis, wherein the transverse axis, when the first and second pipes are coaxially inserted into one another and the clamping strap is adapted to rest in an untightened state against the receiving end section and the insertion end section, is positioned in a central plane of the clamping strap that extends perpendicularly to coaxial center axes of the first and second pipes at a spacing from a center of the first, second, and third spherical zones;

wherein a second inner radius of the clamping strap in the untightened state is smaller than the second outer radius or the third outer radius such that a sum of the spacing and of the second inner radius is greater than the second outer radius or the third outer radius and wherein upon tightening the clamping strap forms a spherical zone in which its center of curvature coincides with the center and its inner radius is similar to the outer radii of the spherical zones.

2. The pipe clamp according to claim 1, wherein the holes of the camping jaws are slotted holes extending outwardly away from the clamping strap, wherein the slotted holes have a length that is selected such that outer ends of the slotted holes in a tightened state of the pipe clamp do not contact the screw shaft.

3. The pipe clamp according to claim 1, wherein the second clamping jaw has a projection projecting past the intermediate part, wherein the projection has a bent portion extending across a free end section of the screw shaft penetrating from the intermediate part, wherein the bent portion is configured to clamp a securing part against the clamping screw shaft.

4. The pipe clamp according to claim 1, wherein the first and second pipes are parts of a motor vehicle exhaust gas pipeline.

5. A connecting arrangement comprised of two pipes and a pipe clamp according to claim 1, wherein the first spherical zone has at least one outer circumferentially extending annular groove and a sealing ring arranged in the annular groove, wherein the sealing ring rests against an inner side of the receiving end section.

6. A pipe clamp for connecting a first pipe and a second pipe that are partially insertable into one another, wherein the first pipe has an insertion end section and the second pipe has a receiving end section, wherein the insertion end section is divided into a first spherical zone and a second spherical zone and wherein the receiving end section is shaped to form a third spherical zone, wherein the first spherical zone adjoins a free end of the insertion end section and has a first outer radius that is identical to a first inner radius of the receiving end section, wherein the first spherical zone is adapted to be inserted into the receiving end section, wherein the second spherical zone has a second outer radius that is identical to a third outer radius of the receiving end section; the pipe clamp comprising:

a clamping strap that, when the pipes are inserted into one another, is configured to be placed circumferentially about the receiving end section and the second spherical zone, wherein the clamping strap has a first outwardly projecting clamping jaw and a second outwardly projecting clamping jaw, wherein the first and second clamping jaws each have a hole;

a clamping screw having a screw head and a threaded shaft;

the clamping screw extending through the holes in the first and second clamping jaws;

wherein the head of the clamping screw is supported on a first side of the first clamping jaw which first side is facing away from the second clamping jaw;

an intermediate part positioned at a first side of the second clamping jaw, which first side is facing away from the first clamping jaw, and having a threaded bore, wherein the threaded shaft of the clamping screw (10) engages the threaded bore;

wherein the clamping strap is curved about a transverse axis, wherein the transverse axis, when the first and second pipes are coaxially inserted into one another and the clamping strap is adapted to rest in an untightened state against the receiving end section and the insertion end section, is positioned in a central plane of the clamping strap that extends perpendicularly to coaxial center axes of the first and second pipes at a spacing from a center of the first, second, and third spherical zones;

wherein a second inner radius of the clamping strap in the untightened state is smaller than the second outer radius or the third outer radius such that a sum of the spacing and of the second inner radius is greater than the second outer radius or the third outer radius and wherein upon tightening the clamping strap forms a spherical zone in which its center of curvature coincides with the center and its inner radius is similar to the outer radii of the spherical zones, wherein the first and second clamping jaws are formed as monolithic parts of the clamping strap, the pipe clamp further comprising a first hinge part having a through bore, wherein the first hinge part is positioned between the screw head and the first clamping jaw and wherein the screw shaft penetrates the through hole, wherein the first and second clamping jaws each have axial edge areas that are bent away from one another in a circular section shape and form axial outer walls that are circular section shaped and bent away from one another, wherein the first hinge part is arranged between the outer walls of the first clamping jaw and between the first side of the first clamping jaw and the screw head, wherein the first hinge part has a cylindrically shaped side resting against the first clamping jaw and is rotatable relative to the first clamping jaw, wherein the intermediate part forms a second hinge part and has a cylindrically shaped side resting against the first side of the second clamping jaw so as to be rotatable relative to the second clamping jaw.

7. The pipe clamp according to claim 6, wherein the first and second hinge parts are solid hinge bolts or hinge sleeves.

8. The pipe clamp according to claim 6, wherein a side of the first hinge part resting against the screw head is planar.

9. The pipe clamp according to claim 8, wherein a side of the second hinge part facing away from the second clamping jaw is planar.

10. The pipe clamp according to claim 9, wherein the ridges are shorter than an axial width of the clamping jaws.

11. The pipe clamp according to claim 6, wherein the first and second clamping jaws each have a second side forming an opposing projection opposing one another, wherein the opposing projections each are double-pitch roof shaped and each have a ridge extending in an axial direction of the pipe clamp, wherein the opposing projections each have a facing side that faces the respective facing side of the respective opposing projection, wherein the facing sides are slanted toward one another so as to be positioned at an acute angle relative to a transverse plane of the clamping screw.

12. A pipe clamp for connecting a first pipe and a second pipe that are partially insertable into one another, wherein the first pipe has an insertion end section and the second pipe has a receiving end section, wherein the insertion end section is divided into a first spherical zone and a second spherical zone and wherein the receiving end section is shaped to form a third spherical zone, wherein the first spherical zone adjoins a free end of the insertion end section and has a first outer radius that is identical to a first inner radius of the receiving end section, wherein the first spherical zone is adapted to be inserted into the receiving end section, wherein the second spherical zone has a second outer radius that is identical to a third outer radius of the receiving end section; the pipe clamp comprising:

a clamping strap that, when the pipes are inserted into one another, is configured to be placed circumferentially about the receiving end section and the second spherical zone, wherein the clamping strap has a first outwardly projecting clamping jaw and a second outwardly projecting clamping jaw, wherein the first and second clamping jaws each have a hole;

a clamping screw having a screw head and a threaded shaft;

the clamping screw extending through the holes in the first and second clamping jaws;

wherein the head of the clamping screw is supported on a first side of the first clamping jaw which first side is facing away from the second clamping jaw;

an intermediate part positioned at a first side of the second clamping jaw, which first side is facing away from the first clamping jaw, and having a threaded bore, wherein the threaded shaft of the clamping screw (10) engages the threaded bore;

wherein the clamping strap is curved about a transverse axis, wherein the transverse axis, when the first and second pipes are coaxially inserted into one another and the clamping strap is adapted to rest in an untightened state against the receiving end section and the insertion end section, is positioned in a central plane of the clamping strap that extends perpendicularly to coaxial center axes of the first and second pipes at a spacing from a center of the first, second, and third spherical zones;

wherein a second inner radius of the clamping strap in the untightened state is smaller than the second outer radius or the third outer radius such that a sum of the spacing and of the second inner radius is greater than the second outer radius or the third outer radius and wherein upon tightening the clamping strap forms a spherical zone in which its center of curvature coincides with the center and its inner radius is similar to the outer radii of the spherical zones, further comprising a tab for pre-mounting the pipe clamp on one of the first and second pipes at least up to a point of final mounting or for securing the pipe clamp stationarily on a chassis of a motor vehicle.

13. The pipe clamp according to claim 12, wherein the tab is welded to the clamping strap or is a monolithic part of the clamping strap.

14. A pipe clamp for connecting a first pipe and a second pipe that are partially insertable into one another, wherein the first pipe has an insertion end section and the second pipe has a receiving end section, wherein the insertion end section is divided into a first spherical zone and a second spherical zone and wherein the receiving end section is shaped to form a third spherical zone, wherein the first spherical zone adjoins a free end of the insertion end section and has a first outer radius that is identical to a first inner radius of the receiving end section, wherein the first spherical zone is adapted to be inserted into the receiving end section, wherein the second spherical zone has a second outer radius that is identical to a third outer radius of the receiving end section; the pipe clamp comprising:
- a clamping strap that, when the pipes are inserted into one another, is configured to be placed circumferentially about the receiving end section and the second spherical zone, wherein the clamping strap has a first outwardly projecting clamping jaw and a second outwardly projecting clamping jaw, wherein the first and second clamping jaws each have a hole;
- a clamping screw having a screw head and a threaded shaft;
- the clamping screw extending through the holes in the first and second clamping jaws;

wherein the head of the clamping screw is supported on a first side of the first clamping jaw which first side is facing away from the second clamping jaw;

an intermediate part positioned at a first side of the second clamping jaw, which first side is facing away from the first clamping jaw, and having a threaded bore, wherein the threaded shaft of the clamping screw (10) engages the threaded bore;

wherein the clamping strap is curved about a transverse axis, wherein the transverse axis, when the first and second pipes are coaxially inserted into one another and the clamping strap is adapted to rest in an untightened state against the receiving end section and the insertion end section, is positioned in a central plane of the clamping strap that extends perpendicularly to coaxial center axes of the first and second pipes at a spacing from a center of the first, second, and third spherical zones;

wherein a second inner radius of the clamping strap in the untightened state is smaller than the second outer radius or the third outer radius such that a sum of the spacing and of the second inner radius is greater than the second outer radius or the third outer radius and wherein upon tightening the clamping strap forms a spherical zone in which its center of curvature coincides with the center and its inner radius is similar to the outer radii of the spherical zones, wherein the clamping strap is provided with reinforcement grooves.

* * * * *